United States Patent [19]
Maynard

[11] Patent Number: 5,949,335
[45] Date of Patent: Sep. 7, 1999

[54] RFID TAGGING SYSTEM FOR NETWORK ASSETS

[75] Inventor: William M. Maynard, Gainesville, Mo.

[73] Assignee: Sensormatic Electronics Corporation, Boca Raton, Fla.

[21] Appl. No.: 09/059,937

[22] Filed: Apr. 14, 1998

[51] Int. Cl.⁶ .................................................. G08B 13/14
[52] U.S. Cl. .................................. 340/572.1; 340/572.4; 340/572.8; 340/568.1; 340/568.2; 340/571
[58] Field of Search .............................. 340/572, 825.34, 340/568, 571, 825.3

[56] References Cited

U.S. PATENT DOCUMENTS

| | | | |
|---|---|---|---|
| 4,510,489 | 4/1985 | Anderson, III et al. | 340/572 |
| 4,779,076 | 10/1988 | Weaver | 340/551 |
| 4,985,695 | 1/1991 | Wilkinson et al. | 340/571 |
| 5,003,292 | 3/1991 | Harding et al. | 340/586 |
| 5,023,600 | 6/1991 | Szklany et al. | 340/572 |
| 5,055,827 | 10/1991 | Philipp | 340/568 |
| 5,151,684 | 9/1992 | Johnsen | 340/572 |
| 5,196,840 | 3/1993 | Leith et al. | 340/825.3 |
| 5,218,371 | 6/1993 | Copeland et al. | 343/742 |
| 5,297,200 | 3/1994 | Murray | 380/4 |
| 5,406,260 | 4/1995 | Cummings et al. | 340/568 |
| 5,530,431 | 6/1996 | Wingard | 340/568 |
| 5,629,981 | 5/1997 | Nerlikar | 380/25 |
| 5,630,058 | 5/1997 | Mosley et al. | 395/187.01 |
| 5,675,321 | 10/1997 | McBride | 340/568 |
| 5,689,242 | 11/1997 | Sims et al. | 340/652 |
| 5,701,411 | 12/1997 | Tran et al. | 395/200.1 |
| 5,714,933 | 2/1998 | Le Van Suu | 340/568 |
| 5,748,083 | 5/1998 | Rietkerk | 340/568 |
| 5,767,771 | 6/1998 | Lamont | 340/571 |

*Primary Examiner*—Thomas Mullen
*Assistant Examiner*—Toan N. Pham
*Attorney, Agent, or Firm*—Quarles & Brady LLP

[57] ABSTRACT

A radio frequency identification (RFID) tagging system for computer network assets comprises: an RFID host; a transponder tag attached to an asset in a computer network, the tag having stored therein tag identifying data, inventory data describing the asset and security data; an electronically erasable and programmable memory (EEPROM) adapted for operation as part of the asset; an RFID reader/writer for reading data from the tag in an interrogation zone; respective communications links between the RFID host and each one of the RFID reader/writer and the asset, enabling the tag identifying data and the inventory or security data to be transferred between each of the RFID host, the EEPROM and the tag, the inventory data also being stored in the EEPROM; and, a control arrangement in the RFID host and in the asset for enabling operation of the asset only in response to a predetermined communications sequence between the RFID host and the asset over the respective communications link, whereby the asset can be identified in the interrogation zone for enabling only an authorized removal of the asset and whereby operation of the asset can be automatically inhibited absent completion of the predetermined communications sequence between the asset and the RFID host.

29 Claims, 2 Drawing Sheets

RFID TAGGING SYSTEM FOR NETWORK ASSETS

BACKGROUND OF THE INVENTION

1. Field of the Invention

This invention relates generally to the field of security for computer networks and components, and in particular, to a radio frequency identification (RFID) tagging system for computer network assets.

2. Description of Related Art

The computer industry is being overwhelmed by the volume of criminal activity concerning theft of equipment and information. While there are some protection and recovery type products offering security to the computer industry, none is known to have a broad based application through the use of intelligent RFID technology incorporating direct or indirect communication with the product.

A long-felt need exists for theft detection through out the supply chain of the computer industry, which can deny unauthorized access to both product use and information.

SUMMARY OF THE INVENTION

The long-felt need of the prior art for a theft detection system throughout the supply chain of the computer industry is satisfied by methods and apparatus for identifying assets that connect to a local area network (LAN) or a wide area network (WAN) area network and integrating those assets with an RFID tagging system. This integration can not only protect the asset, but can render the asset nonfunctional if disconnected from the network or moved through an interrogation zone without authorization.

In accordance with an inventive arrangement, each network asset, for example a work station, is provided with an RFID transponder tag and an electronically erasable and programmable memory (EEPROM) either during, after or as an adjunct to manufacture. Such transponder tags can also be retrofitted to existing network assets which are already in the market place. Computer network assets, such as work stations, file servers, printers, scanners and the like are usually provided with EEPROM's or the like for other purposes, such as for storing an operating system program. The EEPROM used in accordance with the inventive arrangements can be a part of an EEPROM with which a network asset is already manufactured or can be a separate device. The inventive arrangements are not limited to particular kinds of EEPROM devices, the description and acronym being used in a general sense.

An RFID reader/writer, for example a portable device, can be used to program the tag by writing different sets of data thereto. A first set of data can uniquely identify the transponder tag and include, for example, manufacturing site code data and serial number data. This data can be written by the manufacturer of the transponder tag, and can be permanently stored. A second set of data can describe the asset and components within the asset including, for example, model number data, serial number data, and date of manufacture data. Computer network assets can include, for example, processors, work stations, monitors, printers, scanners and network servers. Components can include, for example, hard drives, floppy drives, CD ROM drives, modems, sound boards, memory modules, pre-loaded software and all other equipment or programs which can be sold with or added to a network asset. A third set of data can describe security data including, for example, removal authorization data and predetermined communications sequence completion data. The security data can be used to prevent operation of the asset unless properly connected to the network and can be used to monitor movement of the asset through an interrogation zone of an RFID reader/writer, permitting removal of the asset if authorized and initiating an alarm indicator if removal is unauthorized.

Overall, any asset which can bidirectionally transfer data over a network and any asset or component which can be uniquely identified, usually by a manufacturer's serial number, can be integrated with an RFID tagging system and be a secured asset.

Integration with an RFID tagging system includes establishing communications links for data transfer between an RFID host on the network and each of an RFID reader/writer on the network and a network asset, for example a computer work station. Whenever the asset is moved through an interrogation zone defined by the RFID reader/writer the transponder tag in the asset is interrogated. The RFID reader/writer can read the transponder tag's current data, write new data or both.

In all cases the tag is finally read, and that data package is sent from the RFID reader/writer to the RFID host. The RFID host converts and transmits the data to the computer network asset via normal network or other communication options. Upon receipt of the data, the asset, for example a computer work station, updates the EEPROM to include this new or verified information, completing the transaction by sending a verification signal back to the RFID host.

Data in the EEPROM must also be communicated to the transponder tag. The EEPROM in a computer work station, for example, can be updated via normal input methods, for example the keyboard, with new RFID information. This information can identify newly installed or uninstalled components. This information can also update security status and include, for example, an authorization code for removing the asset from the network and/or from the site, as might be expected for a dockable laptop computer. This data package is sent to the RFID host. The next time an RFID reader/writer identifies the corresponding RFID transponder tag, the information from the EEPROM is written into the RFID transponder tag. This procedure enables authorized removal of the asset. The next time the corresponding transponder tag is identified, use in the network can be reauthorized and if desired, the removal authorization can be automatically erased.

Since the secured network asset must communicate with the RFID host, an opportunity for a hand-shake exists for verification of bi-directional communication and acceptance. Making this verification a requirement during power-up of the secured asset and having the communication connection tested during intervals provides for security by having the EEPROM programmed to terminate operation of the asset if the connection to the RFID system does not exist. This can prevent operation of the secured asset out of the network, even if the secured asset were "successfully" removed without authorization.

In an alternative embodiment, the RFID transponder tag is internally linked to the EEPROM within the secured asset. When the corresponding transponder tag is read by the RFID reader/writer, during the course of an unauthorized exit or removal, the RFID host can initiate writing an inhibit operation code to the transponder tag to inhibit the secured asset from operating. This occurs during the next power-up, when the transponder tag automatically updates the EEPROM, which terminates operation of the secured asset. When the asset is returned to the interrogation zone of the RFID reader/writer, the transponder tag can be updated again to enable operation, and upon power-up, the EEPROM is updated to restore functionality.

A secured computer network asset in accordance with an inventive arrangement, comprises: a computer network asset; a radio frequency identification (RFID) transponder tag attached to the asset, the transponder tag having stored therein a first set of data uniquely identifying the transponder tag, a second set of data describing the asset and components within the asset and a third set of data representing security status of the asset; an electronically erasable and programmable memory (EEPROM) adapted for operation as part of the asset; and, means for transferring the second and third sets of data between the transponder tag and the EEPROM.

The secured asset can comprise means for communicating with an RFID host. More particularly, the means for transferring the second and third sets of data between the transponder tag and the EEPROM can comprise a computer network.

The computer network can comprise: the secured asset; the RFID host; an RFID reader/writer for selectively writing data of the second and third sets to the transponder tag and for selectively reading data of the second and third sets from the transponder tag when the computer asset is in range of the RFID reader/writer; and, means for transferring data of the second and third sets between the RFID host and each of the EEPROM and the RFID reader/writer, whereby the secured asset can be identified within the range of the RFID reader/writer for enabling only an authorized removal of the secured asset.

The secured asset can further comprise means for enabling operation of the secured asset only in response to a predetermined communications sequence between the RFID host and the secured asset, whereby operation of the secured asset outside of the computer network can be automatically inhibited absent completion of the predetermined communications sequence.

Data changes in the asset can be communicated to the RFID host through whichever one of the RFID reader/writer and the network is available.

A radio frequency identification (RFID) tagging system for computer network assets, in accordance with another inventive arrangement, comprises: an RFID host; a transponder tag attached to an asset in a computer network, the transponder tag having stored therein tag identifying data and inventory data describing the asset; an electronically erasable and programmable memory (EEPROM) adapted for operation as part of the asset; an RFID reader/writer for reading data from the transponder tag in an interrogation zone; respective communications links between the RFID host and each one of the RFID reader/writer and the asset, enabling the transponder tag identifying data and the inventory data to be transferred between each of the RFID host, the EEPROM and the transponder tag, the inventory data also being stored in the EEPROM; and, means in the RFID host and in the asset for enabling operation of the asset only in response to a predetermined communications sequence between the RFID host and the asset over the respective communications link, whereby the asset can be identified in the interrogation zone for enabling only an authorized removal of the asset and whereby operation of the asset can be automatically inhibited absent completion of the predetermined communications sequence between the asset and the RFID host.

The RFID host can comprise: means for receiving removal authorization data for the asset; and, means for modifying the data in the EEPROM for enabling operation of the asset absent the predetermined communications sequence between the asset and the RFID host.

The system can further comprise means responsive to the transponder tag for initiating an alarm indicator when the asset is moved through the interrogation zone without removal authorization.

The system can further comprise means for comparing the inventory data in the transponder tag and the inventory data in the EEPROM with one another. An exception indicator can be activated when the inventory data in the transponder tag and the inventory data in the EEPROM do not correspond to one another.

The transponder tag can comprise a first data storage area for data uniquely identifying the transponder tag, a second data storage area for data describing the asset and components within the asset, and a third data storage area for security data. At least one of the data storage areas can provide permanent data storage and at least one other of the data storage areas can provide erasable and writeable data storage.

The data describing the asset and components within the asset can comprise at least one of the following: model number data; serial number data; and, date of manufacture data.

The security data can comprise at least one of the following: removal authorization data; and, predetermined communications sequence completion data.

The data uniquely identifying the transponder tag can comprise at least one of the following: manufacturing site code data; and, serial number data.

The asset can further comprise means for transferring data directly between the transponder tag and the EEPROM, bypassing the RFID host.

The system can be implemented on a large scale, comprising a plurality of the transponder tags respectively attached to a plurality of computer network assets. At least one of the assets can comprise a computer work station on the network, as can the RFID host.

A method for tagging computer network assets with radio frequency identification (RFID) transponders, in accordance with yet another inventive arrangement, comprises the steps of: (A.) writing a first set of data onto a first storage area of a transponder tag with a first RFID reader/writer, said first set of data uniquely identifying said transponder tag and including at least one of the following: manufacturing site code data; and, serial number data; (B.) writing a second set of data onto a second storage area of said transponder tag with said first RFID reader/writer, said second set of data describing an asset and components within said asset and including at least one of the following: model number data; serial number data; and, date of manufacture data; (C.) providing said transponder tag with a third storage area for a third set of data; (D.) attaching said transponder tag to said asset; and, (E.) providing said asset with an electronically erasable and programmable memory (EEPROM) adapted for operation as part of said asset and capable of storing at least said second and third sets of data.

The method can further comprise the steps of: (F.) connecting said asset to a computer network; (G.) connecting an RFID host to said computer network; (H.) establishing an interrogation zone with a second RFID reader/writer; (I.) connecting said second RFID reader/writer to said computer network; (J.) establishing respective communications links between said RFID host and each one of said second RFID reader/writer and said asset; (K.) transferring said second set of data from said transponder tag to said EEPROM; and, (L.) transferring data between said EEPROM and said transponder tag as said second set of data is updated to correspond to authorized modification of said asset.

The method can still further comprise the steps of: (M.) enabling operation of said asset only in response to a predetermined communications sequence between said RFID host and said asset over said respective communications link; (N.) identifying said asset when said asset is in said interrogation zone; and, (O.) writing removal authorization data into said third storage area of said transponder tag, whereby said asset can be identified in said interrogation zone for enabling only an authorized removal of said asset, whereby operation of said asset can be automatically inhibited absent completion of said predetermined communications sequence between said asset and said RFID host, and whereby unauthorized modification of said asset can be detected.

A method for tagging computer network assets with radio frequency identification (RFID) transponders in accordance with yet another inventive arrangement comprises the steps of: (A.) providing an asset in a computer network with an RFID transponder tag and an electronically erasable and programmable memory (EEPROM); (B.) establishing a first data base in said transponder tag, said first data base including an inventory of said network asset and components within said asset and including removal authorization data; (C.) establishing a second data base in said EEPROM, said second data base including said inventory of said network asset and components within said asset and including said removal authorization data; and, (D.) transferring data updates from each one of said transponder tag and said EEPROM to the other one of said transponder tag and said EEPROM, whereby the integrity of said inventory data and said removal authorization can be interrogated and revised by an RFID reader/writer.

The method can further comprise the steps of: (E.) connecting said RFID reader/writer to said computer network; (F.) connecting an RFID host to said computer network; (G.) establishing respective communications links between said RFID host and each one of said RFID reader/writer and said asset; and, (H.) implementing said transferring data step through said RFID host.

The method can still further comprise the steps of: (I.) enabling operation of said asset only in response to a predetermined communications sequence between said RFID host and said asset over said respective communications link; (J.) identifying said asset when said asset is in said interrogation zone; and, (K.) writing removal authorization data into said third storage area of said transponder tag, whereby said asset can be identified in said interrogation zone for enabling only an authorized removal of said asset, whereby operation of said asset can be automatically inhibited absent completion of said predetermined communications sequence between said asset and said RFID host, and whereby unauthorized modification of said asset can be detected.

The method can still further comprising the steps of: (E.) establishing a direct communications link in said asset between said transponder tag and said EEPROM; and, (F.) implementing said data transferring step over said direct communications link.

The method can yet further comprise the steps of: (G.) connecting said RFID reader/writer to said computer network; and,(H.) identifying said asset when said asset is in said interrogation zone, whereby removal authorization status can be determined and said asset can be disabled by data written onto said transponder tag and transferred to said EEPROM over said direct communications link.

DETAILED DESCRIPTION OF THE PREFERRED EMBODIMENTS

Figure 1:
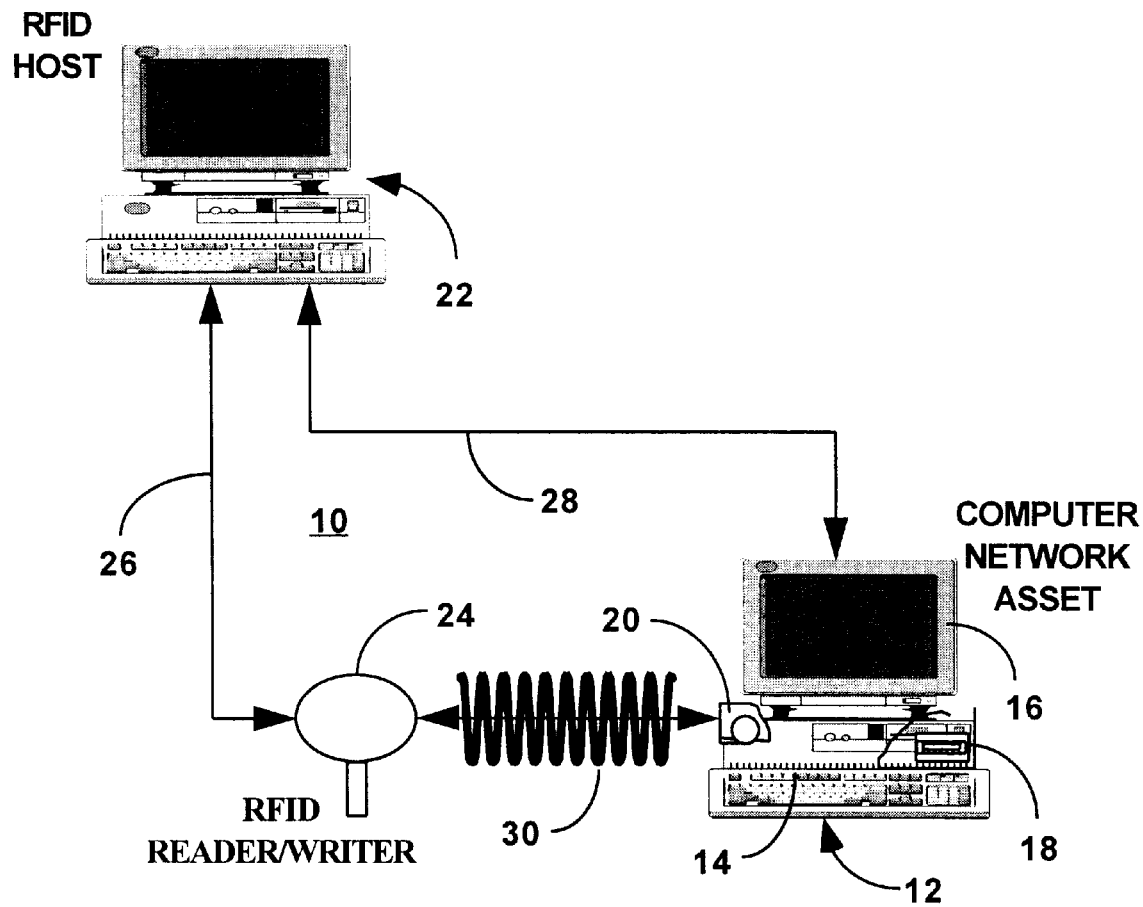
FIG. 1 is a diagram useful for explaining the integration of a radio frequency identification tagging system and computer network assets in accordance with the inventive arrangements.

FIG. 1 illustrates a computer network 10 which can be utilized to integrate computer network assets with an RFID tagging system. The network comprises at least one network asset to be secured or integrated, for example a computer work station 12. The work station 12 comprises a processor 14, a monitor 16 and a number of other components which are not designated by reference numerals for purposes of simplification, such as a keyboard, a hard drive memory unit, a modem and an array of software packages and programs. The work station also comprises an electronically erasable and programmable memory (EEPROM) 18 and a transponder tag 20, of the kind compatible with RFID tagging systems.

The EEPROM 18 can be a device dedicated to the security system or the EEPROM 18 can be part of an EEPROM which is ordinarily supplied with the work station. Other kinds of computer network assets may not ordinarily be supplied with EEPROM's, such as printers and scanners. Such kinds of assets can also be supplied with transponder tags and EEPROM's, although such an asset would require a communications capacity for transferring data, as explained below.

The network also comprises an RFID host 22, which can also be a computer work station, an RFID reader/writer, for example a portable RFID reader/writer 24 as shown. Communications links 26 and 28 must be established between the RFID host 22 and each of the RFID reader/writer 24 and the work station or asset 12, for transferring data to and from the transponder tag, to and from the EEPROM 18 and, if necessary or desirable, between the transponder tag 20 and the EEPROM 18. Communication links 26 and 28 can advantageously be part of the kinds of communications links normally used in computer networks, as illustrated, or can be established independently as conditions apart from the inventive arrangements may require. The RFID reader/writer 24 communicates with the transponder tag by a radio frequency communications link 30.

The network 10 can be used in a manufacturing facility, at which time the transponder tag 20 and the EEPROM 18 can be installed as part of the manufacturing process. The network 10 can also be advantageously utilized for retrofitting network assets with transponder tags and EEPROM's, due to the convenience of the portable RFID reader/writer 24.

Figure 3:
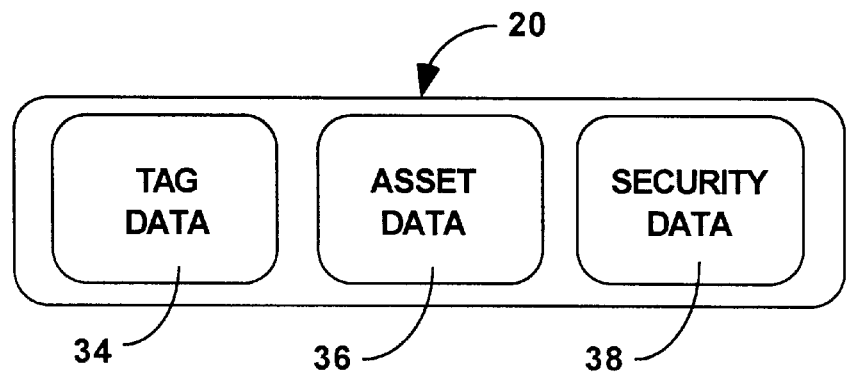
FIG. 3 is a diagram of a transponder tag in accordance with the inventive arrangements.

A suitable memory arrangement for a transponder tag 20 is shown in FIG. 3. The transponder tag has a first data storage area 34 for data uniquely identifying the transponder tag, a second data storage area 36 for data describing said asset and components within said asset, and a third data storage area 38 for security data.

Data uniquely identifying the transponder tag can comprise at least one of the following: manufacturing site code data; and, serial number data. This data can be permanently written onto the transponder tag by the tag manufacturer. Alternatively, this data can be written onto the tag by the computer asset manufacturer, if not already present.

Data describing the asset and components within the asset can comprise at least one of the following: model number data; serial number data; and, date of manufacture data. Such data can be supplied, for example, for each asset and component, hardware or software, which is supplied by its respective manufacturer with a model number and/or a serial number and/or a date of manufacture. In this regard, the data in the transponder tags and/or the EEPROM'S can be used to verify authorized warranty repairs and to identify attempts at warranty fraud.

Security data can comprise at least one of the following: removal authorization data; and, predetermined communications sequence completion data. This data is more conveniently stored after the asset has been connected to a consumer's or purchaser's computer network, and is expected to be updated as the asset is modified, relocated and/or removed from the network on a regular basis, as might a laptop computer otherwise residing in a docking bay connected to a computer network.

Figure 2:
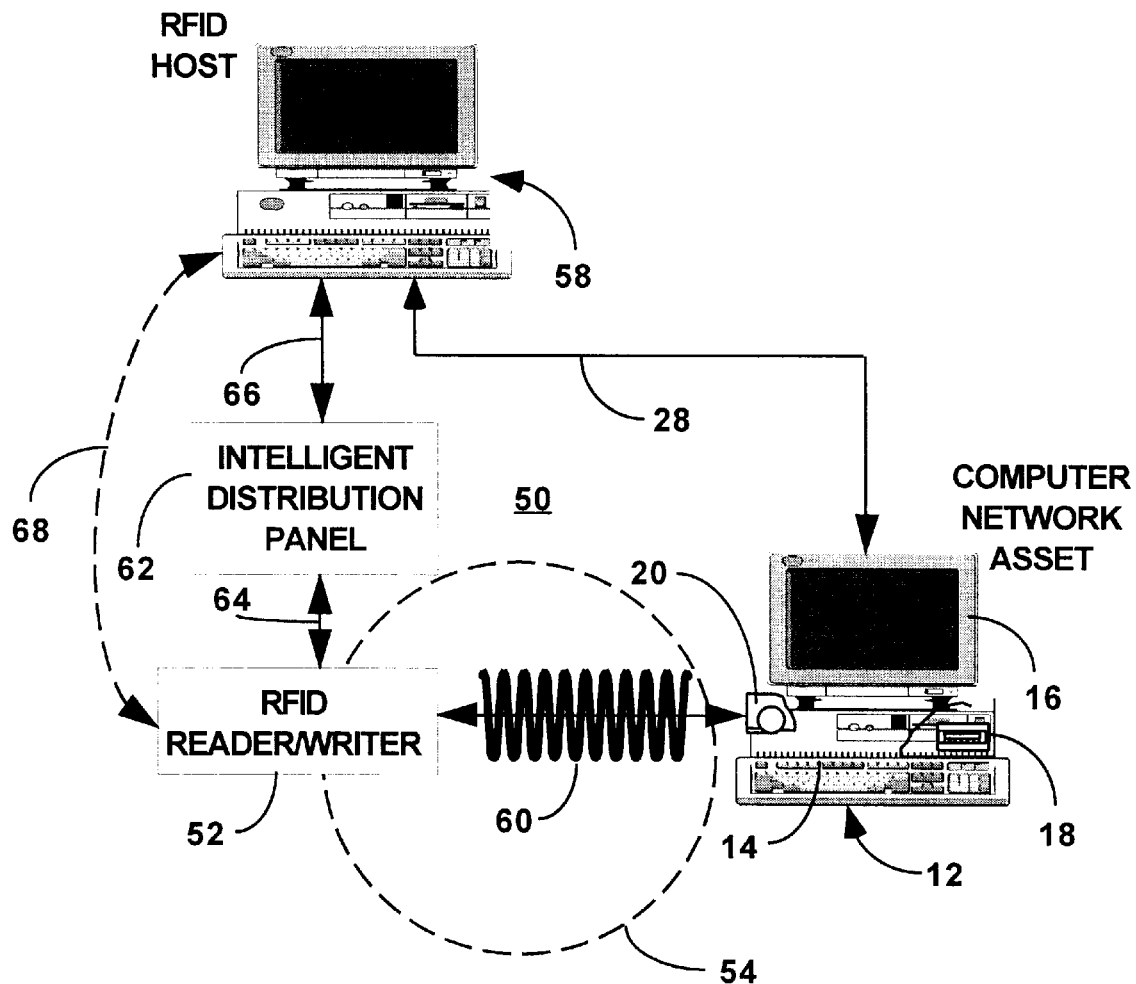
FIG. 2 is a diagram useful for explaining the operation of secured computer network assets integrated with a radio frequency identification tagging system in accordance with the inventive arrangements.

A computer network 50 integrated with an RFID tagging system, for example as explained in connection with FIGS. 1 and 2, is shown in FIG. 3. Computer network 50 is in many respects similar to network 10, and in fact, can be utilized to load transponder tags and EEPROM's into assets to be secured, although not as conveniently. As a protected network, network 50 has one or more doorway RFID reader/writers 52 connected thereto, each of which defines a fixed interrogation zone 54, arranged to encompass a path over which computer network assets must be passed if removed from or brought into an area to be protected. Network 50 has the work station 12, as shown in FIG. 1 and an RFID host 58, which can similar to, or substantially identical to the RFID host 22 shown in FIG. 1. The doorway RFID reader communicates with the transponder tag 20 by a radio frequency communications link 60. The doorway RFID reader/writer 52 can be connected to an intelligent distribution panel 62 by a communications link 64. The intelligent distribution panel 62 can be connected to network 50 and to the RFID host 58 by a communications link 66. Alternatively, the doorway RFID reader/writer 52 can be connected directly to the network 50 and RFID host 58 by a communications link 68. Use of the intelligent distribution panel 60 will depend upon how many different networks are being protected by the same RFID host or doorway RFID reader/writer, as the intelligent distribution panel can be programmed to communicate with different secured networks depending upon the data read from the transponder tag of the asset in the interrogation zone.

Whenever the asset is moved through the interrogation zone 54 defined by the RFID reader/writer 52 the transponder tag 20 in the asset is interrogated. The RFID reader/writer can read the transponder tag's current data, write new data or both.

In all cases the tag is finally read, and that data package is sent from the RFID reader/writer 52 to the RFID host 58. The RFID host 58 converts and transmits the data to the computer network asset via normal network or other communication options. Upon receipt of the data, the asset, for example the computer work station 12, updates the EEPROM 18 to include this new or verified information, completing the transaction by sending a verification signal back to the RFID host 58.

Data in the EEPROM 18 must also be communicated to the transponder tag 20. The EEPROM 18 in the computer work station, for example, can be updated via normal input methods, for example the keyboard, with new RFID information. This information can identify newly installed or uninstalled components. This information can also update security status and include, for example, an authorization code for removing the asset from the network and/or from the site, as might be expected for a dockable laptop computer. This data package is sent to the RFID host 58. The next time an RFID reader/writer identifies the corresponding RFID transponder tag in the interrogation zone 54, the information from the EEPROM 18 is written into the RFID transponder tag 20. This procedure enables authorized removal of the asset. The next time the corresponding transponder tag is identified, use in the network can be reauthorized and if desired, the removal authorization can be automatically erased.

Since the secured network asset must communicate with the RFID host 58, an opportunity for a hand-shake exists for verification of bi-directional communication and acceptance. Making this verification a requirement during power-up of the secured asset and having the communication connection tested during intervals provides for security by having the EEPROM programmed to terminate operation of the asset if the connection to the RFID system does not exist. This can prevent operation of the secured asset out of the network, even if the secured asset were "successfully" removed without authorization.

In an alternative embodiment, the RFID transponder tag 20 is internally linked to the EEPROM 18 within the secured asset, as indicated by reference numeral 64. When the corresponding transponder tag is read by the RFID reader/writer 58, during the course of an unauthorized exit or removal, the RFID host 58 can initiate writing an inhibit operation code to the transponder tag to inhibit the secured asset from operating. The RFID host can also initiate operation of an alarm indicator 62, either visual or audible or both. Inhibiting of the operation occurs during the next power-up, when the transponder tag 20 automatically updates the EEPROM 18, which terminates operation of the secured asset. When the asset is returned to the interrogation zone 54 of the RFID reader/writer 52, the transponder tag 20 can be updated again to enable operation, and upon power-up, the EEPROM 18 is updated to restore functionality.

What is claimed is:

1. A radio frequency identification (RFID) tagging system for computer network assets, the system comprising:

an RFID host;

a transponder tag attached to an asset in a computer network, said transponder tag having stored therein tag identifying data and inventory data describing said asset;

an electronically erasable and programmable memory (EEPROM) adapted for operation as part of said asset;

an RFID reader/writer for reading data from said transponder tag in an interrogation zone;

respective communications links between said RFID host and each one of said RFID reader/writer and said asset, enabling said transponder tag identifying data and said inventory data to be transferred between each of said RFID host, said EEPROM and said transponder tag, said inventory data also being stored in said EEPROM; and, means in said RFID host and in said asset for enabling operation of said asset only in response to a predetermined communications sequence between said RFID host and said asset over said respective communications link, whereby said asset can be identified in said interrogation zone for enabling only an authorized removal of said asset and whereby operation of said asset can be automatically inhibited absent completion of said predetermined communications sequence between said asset and said RFID host; and wherein data changes in said asset can be communicated to said RFID host through whichever one of said RFID reader/writer and said network is available.

2. The system of claim 1, wherein said RFID host comprises:

means for receiving removal authorization data for said asset; and, means for modifying said data in said EEPROM for enabling operation of said asset absent said predetermined communications sequence between said asset and said RFID host.

3. The system of claim 1, further comprising means responsive to said transponder tag for initiating an alarm indicator when said asset is moved through said interrogation zone without removal authorization.

4. The system of claim 1, wherein said transponder tag has a first data storage area for data uniquely identifying said transponder tag, a second data storage area for data describing said asset and components within said asset, and a third data storage area for security data.

5. The system of claim 4, wherein said data describing said asset and components within said asset comprises at least one of the following:

model number data;
serial number data; and,
date of manufacture data.

6. The system of claim 4, wherein said security data comprises at least one of the following:

removal authorization data; and,
predetermined communications sequence completion data.

7. The system of claim 4, wherein said data uniquely identifying said transponder tag comprises at least one of the following:

manufacturing site code data; and,
serial number data.

8. The system of claim 4, wherein at least one of said data storage areas provides permanent data storage and at least one other of said data storage areas provides erasable and writeable data storage.

9. The system of claim 1, wherein said asset further comprises means for transferring data directly between said transponder tag and said EEPROM, bypassing said RFID host.

10. The system of claim 1, comprising a plurality of said transponder tags respectively attached to a plurality of computer network assets.

11. The system of claim 10, wherein at least one of said assets comprises a computer work station on said network.

12. The system of claim 10, wherein said RFID host comprises a work station on said network.

13. The system of claim 1, wherein said respective communications links between said RFID host and each one of said RFID reader/writer and said asset are bidirectional communications links.

14. A secured computer network asset, comprising:

a computer network asset;

a radio frequency identification (RFID) transponder tag attached to said asset, said transponder tag having stored therein a first set of data uniquely identifying said transponder tag, a second set of data describing said asset and components within said asset and a third set of data representing security status of said asset;

an electronically erasable and programmable memory (EEPROM) adapted for operation as part of said asset; and, means for transferring said second and third sets of data between said transponder tag and said EEPROM.

15. The secured asset of claim 14, comprising means for communicating with an RFID host.

16. The secured asset of claim 15, wherein said means for transferring said second and third sets of data between said transponder tag and said EEPROM comprises a computer network.

17. The secured asset of claim 16, wherein said computer network comprises:

said secured asset;
said RFID host;

an RFID reader/writer for selectively writing data of said second and third sets to said transponder tag and for selectively reading data of said second and third sets from said transponder tag when said computer asset is in range of said RFID reader/writer; and, means for transferring data of said second and third sets between said RFID host and each of said EEPROM and said RFID reader/writer, whereby said secured asset can be identified within said range of said RFID reader/writer for enabling only an authorized removal of said secured asset.

18. The secured asset of claim 17, further comprising means for enabling operation of said secured asset only in response to a predetermined communications sequence between said RFID host and said secured asset, whereby operation of said secured asset outside of said computer network can be automatically inhibited absent completion of said predetermined communications sequence.

19. A method for tagging computer network assets with radio frequency identification (RFID) transponders, the method comprising the steps of:

(A.) writing a first set of data onto a first storage area of a transponder tag with a first RFID reader/writer, said first set of data uniquely identifying said transponder tag and including at least one of the following:
manufacturing site code data; and,
serial number data;

(B.) writing a second set of data onto a second storage area of said transponder tag with said first RFID reader/writer, said second set of data describing an asset and components within said asset and including at least one of the following:
model number data;
serial number data; and,
date of manufacture data;

(C.) providing said transponder tag with a third storage area for a third set of data;

(D.) attaching said transponder tag to said asset; and, (E.) providing said asset with an electronically erasable and programmable memory (EEPROM) adapted for operation as part of said asset and capable of storing at least said second and third sets of data.

20. The method of claim 19, further comprising the steps of:
   (F.) connecting said asset to a computer network;
   (G.) connecting an RFID host to said computer network;
   (H.) establishing an interrogation zone with a second RFID reader/writer;
   (I.) connecting said second RFID reader/writer to said computer network;
   (J.) establishing respective communications links between said RFID host and each one of said second RFID reader/writer and said asset;
   (K.) transferring said second set of data from said transponder tag to said EEPROM; and,
   (L.) transferring data between said EEPROM and said transponder tag as said second set of data is updated to correspond to authorized modification of said asset.

21. The method of claim 20, further comprising the steps of:
   (M.) enabling operation of said asset only in response to a predetermined communications sequence between said RFID host and said asset over said respective communications link;
   (N.) identifying said asset when said asset is in said interrogation zone; and,
   (O.) writing removal authorization data into said third storage area of said transponder tag,
      whereby said asset can be identified in said interrogation zone for enabling only an authorized removal of said asset, whereby operation of said asset can be automatically inhibited absent completion of said predetermined communications sequence between said asset and said RFID host, and whereby unauthorized modification of said asset can be detected.

22. A method for tagging computer network assets with radio frequency identification (RFID) transponders, the method comprising the steps of:
   (A.) providing an asset in a computer network with an RFID transponder tag and an electronically erasable and programmable memory (EEPROM);
   (B.) establishing a first data base in said transponder tag, said first data base including an inventory of said network asset and components within said asset and including removal authorization data;
   (C.) establishing a second data base in said EEPROM, said second data base including said inventory of said network asset and components within said asset and including said removal authorization data; and,
   (D.) transferring data updates from each one of said transponder tag and said EEPROM to the other one of said transponder tag and said EEPROM,
      whereby the integrity of said inventory data and said removal authorization can be interrogated, revised or otherwise acted upon by an RFID reader/writer.

23. The method of claim 22, further comprising the steps of:
   (E.) connecting said RFID reader/writer to said computer network;
   (F.) connecting an RFID host to said computer network;
   (G.) establishing respective communications links between said RFID host and each one of said RFID reader/writer and said asset; and,
   (H.) implementing said transferring data step through said RFID host.

24. The method of claim 23, further comprising the steps of:
   (I.) enabling operation of said asset only in response to a predetermined communications sequence between said RFID host and said asset over said respective communications link;
   (J.) identifying said asset when said asset is in said interrogation zone; and,
   (K.) writing removal authorization data into said third storage area of said transponder tag,
      whereby said asset can be identified in said interrogation zone for enabling only an authorized removal of said asset, whereby operation of said asset can be automatically inhibited absent completion of said predetermined communications sequence between said asset and said RFID host, and whereby unauthorized modification of said asset can be detected.

25. The method of claim 22, further comprising the steps of:
   (E.) establishing a direct communications link in said asset between said transponder tag and said EEPROM; and,
   (F.) implementing said data transferring step over said direct communications link.

26. The method of claim 25, further comprising the steps of:
   (G.) connecting said RFID reader/writer to said computer network; and,
   (H.) identifying said asset when said asset is in said interrogation zone,
      whereby removal authorization status can be determined and said asset can be disabled by data written onto said transponder tag and transferred to said EEPROM over said direct communications link.

27. A radio frequency identification (RFID) tagging system for computer network assets, the system comprising:
   an RFID host;
   a transponder tag attached to an asset in a computer network, said transponder tag having stored therein tag identifying data and inventory data describing said asset;
   an electronically erasable and programmable memory (EEPROM) adapted for operation as part of said asset;
   an RFID reader/writer for reading data from said transponder tag in an interrogation zone;
   respective communications links between said RFID host and each one of said RFID reader/writer and said asset, enabling said transponder tag identifying data and said inventory data to be transferred between each of said RFID host, said EEPROM and said transponder tag, said inventory data also being stored in said EEPROM;
   means in said RFID host and in said asset for enabling operation of said asset only in response to a predetermined communications sequence between said RFID host and said asset over said respective communications link;
   means for comparing said inventory data in said transponder tag and said inventory data in said EEPROM with one another; and,
   means for generating an output signal when said inventory data in said transponder tag and said inventory data in said EEPROM do not correspond to one another;

whereby said asset can be identified in said interrogation zone for enabling only an authorized removal of said asset and whereby operation of said asset can be automatically inhibited absent completion of said predetermined communications sequence between said asset and said RFID host.

28. A radio frequency identification (RFID) tagging system for computer network assets, the system comprising:

an RFID host;

a transponder tag attached to an asset in a computer network, said transponder tag having stored therein tag identifying data and inventory data describing said asset;

an electronically erasable and programmable memory (EEPROM) adapted for operation as part of said asset;

an RFID reader/writer for reading data from said transponder tag in an interrogation zone;

respective communications links between said RFID host and each one of said RFID reader/writer and said asset, enabling said transponder tag identifying data and said inventory data to be transferred between each of said RFID host, said EEPROM and said transponder tag, said inventory data also being stored in said EEPROM;

means in said RFID host and in said asset for enabling operation of said asset only in response to a predetermined communications sequence between said RFID host and said asset over said respective communications link; and, means for transferring data directly between said transponder tag and said EEPROM, bypassing said RFID host, whereby said asset can be identified in said interrogation zone for enabling only an authorized removal of said asset and whereby operation of said asset can be automatically inhibited absent completion of said predetermined communications sequence between said asset and said RFID host.

29. A radio frequency identification (RFID) tagging system for computer network assets, the system comprising:

an RFID host;

a transponder tag attached to an asset in a computer network, said transponder tag having stored therein tag identifying data and inventory data describing said asset;

an electronically erasable and programmable memory (EEPROM) adapted for operation as part of said asset;

an RFID reader/writer for reading data from said transponder tag in an interrogation zone;

respective communications links between said RFID host and each one of said RFID reader/writer and said asset, enabling said transponder tag identifying data and said inventory data to be transferred between each of said RFID host, said EEPROM and said transponder tag, said inventory data also being stored in said EEPROM, wherein data changes in said asset can be communicated to said RFID host through whichever one of said RFID reader/writer and said network is available; and, means in said RFID host and in said asset for enabling operation of said asset only in response to a predetermined communications sequence between said RFID host and said asset over said respective communications link, whereby said asset can be identified in said interrogation zone for enabling only an authorized removal of said asset and whereby operation of said asset can be automatically inhibited absent completion of said predetermined communications sequence between said asset and said RFID host.

\* \* \* \* \*